B. F. COPP.
HYGIENIC DISH FOR TOOTH POWDER OR PASTE.
APPLICATION FILED FEB. 12, 1914.
1,111,136.
Patented Sept. 22, 1914.
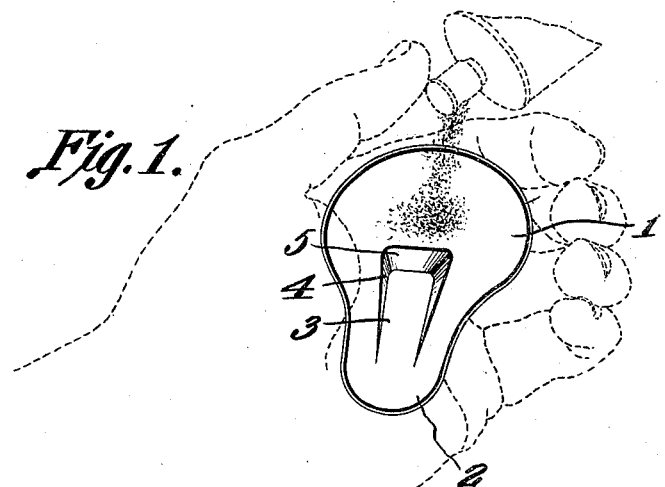
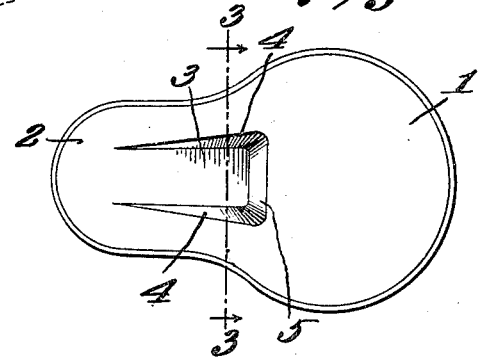
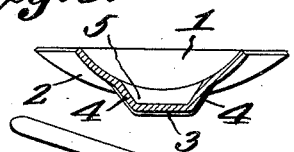
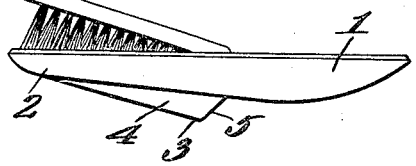
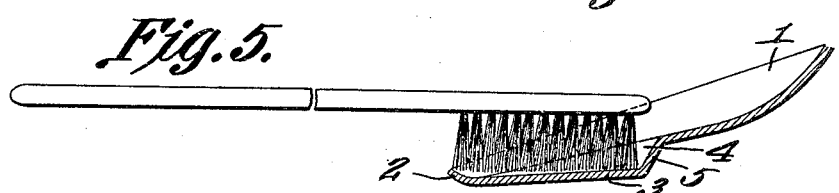
Benjamin F. Copp,
Inventor
by C. A. Snow & Co.
Attorneys
Witnesses

UNITED STATES PATENT OFFICE.

BENJAMIN F. COPP, OF SILVER CITY, NEW MEXICO.

HYGIENIC DISH FOR TOOTH POWDER OR PASTE.

1,111,136.      Specification of Letters Patent.      Patented Sept. 22, 1914.

Application filed February 12, 1914. Serial No. 818,382.

*To all whom it may concern:*

Be it known that I, BENJAMIN F. COPP, a citizen of the United States, residing at Silver City, in the county of Grant and State of New Mexico, have invented a new and useful Hygienic Dish for Tooth Powder or Paste, of which the following is a specification.

The present invention appertains to a dish or receptacle for tooth powder or paste, and aims to provide a novel and improved article of that character.

It is the object of the present invention to provide a dish of the nature indicated, which will be of unique formation, in order that the dish may be employed for facilitating the application to a tooth brush, of sufficient tooth powder or paste, for one cleaning of the teeth.

Another object of the present invention is to provide a dish of that nature, which will be hygienic, as well as simple and convenient in its use, and which will be simple and inexpensive in construction.

A further object of the present invention is to provide a dish of the character specified, which may be employed for readily admixing a quantity of tooth powder or paste, with an antiseptic liquid to provide a paste, or semi-paste, which may be applied to the bristles of a tooth brush in a ready and non-wasteful manner.

With the foregoing and other objects in view, which will be apparent as the nature of the invention is better understood, the present invention resides in the peculiar formation of the dish or receptacle, as hereinafter set forth, it being understood that changes in the details of the dish can be made within the scope of what is claimed, without departing from the spirit of the invention.

The invention has been illustrated in its preferred embodiment in the acompanying drawing, wherein:—

Figure 1 is a perspective view of the dish as in use. Fig. 2 is a plan view of the dish. Fig. 3 is a cross sectional view taken on the line 3—3 of Fig. 2. Fig. 4 is a side elevation of the dish, illustrating a tooth brush applied thereto. Fig. 5 is a longitudinal section of the dish held in a slightly inclined position, and illustrating a tooth brush applied thereto.

In carrying out the present invention, the dish is preferably stamped or pressed from sheet metal, although it may be otherwise fashioned, and embodies an enlarged or flared portion 1, having a radial extension 2, which is of a width somewhat less than the diameter of the enlarged or flared portion 1. The dish is thus of obovate or pear shape, and the dish is of greatest depth at the center of the enlarged or flared portion 1, the extension 2 being slightly shallower due to the fact that the bottom of the dish is inclined from the center of the portion 1 to the free end portion of the extension.

The extension 2 is provided with a longitudinal depression 3 in its bottom, the depression extending partially into the enlarged or flared portion 1, and being disposed radially of the enlarged portion 1. The depression 3 terminates short of the free end of the extension 2, and has its bottom inclined from the inner end of the depression to the outer end adjoining the free end of the extension 2. The outer end of the bottom of the depression 3 is preferably tangential to the free end portion of the extension 2, while the inner end portion of the depression 3 is relatively deep and wide at the central portion of the dish, as a whole, or at that portion of the dish intermediate the enlargement or body 1 and the extension 2. The sides 4 of the depression 3 are preferably inclined, as well as the inner end 5 of the depression, and the outer ends of the bottom and sides of the depression merge gently into the free end portion of the extension 2.

In use, the dish may be conveniently and firmly held in the palm of the hand, as delineated in Fig. 1, the enlarged portion or body 1 being preferably held between the first two fingers and the thumb, with the extension 2 projecting over the palm. Sufficient tooth powder or paste may then be poured into or deposited in the dish, for one cleaning of the teeth, the powder or paste flowing into the depression 3, whereby the bristles of a tooth brush may be readily dipped into the powder or paste within the depression 3, as suggested in Figs. 4 and 5, to apply the powder or paste to the bristles in an effective and non-wasteful manner. The depression 3 is preferably of such a size, as to snugly receive the bristles of the tooth brush, whereby most, if not all, of the powder or paste will be taken up by the bristles. When the dish is held horizontal, the powder or paste being level in the depression 3, will enable the greater portion of the tooth powder or paste to be applied to the bristles at the end of the tooth brush, while, when the dish is held slightly inclined, as seen in Fig. 5, the powder or paste may be applied uniformly throughout the bristles.

It is to be observed that the inner end of the depression or channel projects downwardly below the bottom of the body portion of the dish, in order that the powder or paste will flow into the depression or channel, and it is also to be observed that the rim of the dish at the free portion of the extension 2 is turned upwardly from the outer end of the depression or channel bottom, as seen in Fig. 5, to prevent the paste or liquid from flowing out of the depression or channel when the dish is tilted or inclined as seen in the said figure.

It is evident that the powder or paste deposited within the dish, will naturally settle or flow into the depression, to avoid scattering and waste of the powder or paste. Furthermore, the enlarged portion of the body 1 allows the powder or paste to be readily poured into the dish, without spilling, the powder or paste then flowing into the extension 2 and depression or channel 3 thereof.

The dish is of decided advantage for handling a tooth powder or paste and an antiseptic solution, the same being poured into the dish, and in being admixed, flowing into the depression 3, in order that the tooth brush may be dipped therein.

It is to be noted that the dish is of peculiar configuration, in order that it may be conveniently and firmly held in the palm of the hand, the margin or edge of the dish being devoid of beads, flanges or other encumbering portions, which would be liable to catch filth or foreign matter, so as to render the dish unsanitary. The dish may be readily cleansed, and if desired, may be employed as a cover or lid for a combined powder and antiseptic bottle holder.

Having thus described the invention, what is claimed as new is:—

1. A tooth powder or paste dish, including a body portion having an extension, the dish being of greatest depth at the center of the body portion and the bottom of the dish being inclined from the center of the body portion to the free end portion of the extension, the extension having a longitudinal depression to receive the bristles of a tooth brush, the bottom of the depression being inclined and being tangential with the free end portion of the extension, the inner end of the depression being relatively deep, extending partially into the body portion, projecting downwardly below the bottom of the said body portion, and the rim of the dish at the free portion of the extension being turned upwardly.

2. A tooth powder or paste dish including an enlarged body portion having a radial extension narrower in width than the diameter of the body portion, the dish being of greatest depth at the center of the body portion and the bottom of the dish being inclined from the center of the body portion to the free end portion of the extension, the extension having a longitudinal depression extending partially into the body portion, the bottom of the depression being inclined and being tangential with the free end portion of the extension, the sides and inner end of the depression being inclined, the inner end of the depression being relatively deep and wide and projecting downwardly below the bottom of the said body portion, and the outer ends of the bottom sides of the depression merging gently into the free end portion of the extension, and the rim of the dish at the free end portion of the extension being turned upwardly.

In testimony that I claim the foregoing as my own, I have hereto affixed my signature in the presence of two witnesses.

BENJAMIN F. COPP.

Witnesses:
   J. W. PENNEWILL,
   I. W. DREIFUSS.